(12) United States Patent
Fukushima et al.

(10) Patent No.: US 6,975,478 B2
(45) Date of Patent: Dec. 13, 2005

(54) METHOD FOR CALIBRATING DISK DRIVE SERVO CONTROL SYSTEM GAIN VALUES DURING MANUFACTURING

(75) Inventors: Craig N. Fukushima, Monte Sereno, CA (US); Kevin I. Tzou, San Jose, CA (US); Mantle Man-Hon Yu, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 10 days.

(21) Appl. No.: 10/815,314

(22) Filed: Apr. 1, 2004

(65) Prior Publication Data

US 2005/0219737 A1   Oct. 6, 2005

(51) Int. Cl.[7] .............................................. G11B 5/58
(52) U.S. Cl. ................................ 360/77.01; 360/77.04
(58) Field of Search ...................................... 360/77.01

(56) References Cited

U.S. PATENT DOCUMENTS 5,825,579 A * 10/1998 Cheung et al. .......... 360/77.08
5,982,173 A * 11/1999 Hagen ........................ 324/212
6,421,198 B1    7/2002 Lamberts et al.
2003/0063404 A1 4/2003 Takaishi et al.

* cited by examiner

Primary Examiner—David Hudspeth
Assistant Examiner—James Olson
(74) Attorney, Agent, or Firm—Thomas R. Berthold

(57) ABSTRACT

A disk drive manufacturing method calibrates the stitching gain of a position error signal (PES) by sampling servo information from a quadrature servo pattern while the head is maintained at the quarter-track positions and then calculating the kurtosis of the distribution of the PES values calculated from the samples. Because the kurtosis is a measure of the deviation from a normal or Gaussian distribution, the kurtosis of a PES distribution is used to optimize the stitching gain value through iteration until the kurtosis is close to zero, indicating that the PES with the optimal stitching gain values has a near-Gaussian distribution. The stitching gain calibration is performed for all heads and for multiple tracks across the surface of the disk for each head. The resulting values of stitching gain, each associated with a head and track, are stored in the disk drive memory and recalled during operation of the disk drive.

13 Claims, 6 Drawing Sheets

METHOD FOR CALIBRATING DISK DRIVE SERVO CONTROL SYSTEM GAIN VALUES DURING MANUFACTURING

TECHNICAL FIELD

This invention relates generally to magnetic recording hard disk drives, and more particularly to a method during disk drive manufacturing for calibrating gain values used by the servo control system to position the read/write heads to the data tracks on the disks.

BACKGROUND OF THE INVENTION

Magnetic recording hard disk drives use a servo-mechanical control system to position the read/write heads to the desired data tracks and to maintain the heads on the tracks as required for read and write operations. Current hard disk drives use a rotary voice-coil-motor (VCM) as the actuator to position the read/write heads on the data tracks. Typically, each read/write head is attached to the end of a head carrier or air-bearing slider that rides on a cushion or bearing of air above the rotating disk. The slider is attached to a relatively flexible suspension that permits the slider to "pitch" and "roll" on the air bearing, with the suspension being attached to the end of the VCM actuator arm.

Special "servo" or head-positioning information is written in fields in circumferentially-spaced servo sectors in each of the concentric data tracks on each disk surface. The servo pattern is constructed across multiple tracks so that the read-back signal from the head, as it passes over the pattern, can be decoded to yield a head-position error signal (PES) that is used by the control system to maintain the head on the track during reading and writing of data.

The conventional servo pattern is a quadrature pattern that is decoded to yield two signals, a normal (P-PES) signal that is used primarily on one half of a track width and a quadrature (Q-PES) signal that is used primarily on the other half of a track width. At the quarter-track positions where the P-PES and Q-PES overlap, sometimes called the "stitching" regions, discontinuities between the P-PES and Q-PES signals can occur and the control system must select one or the other signal as the PES. The stitching gain, also referred to as the PES gain, is adjusted to ensure a continuous transition between P-PES and Q-PES at these quarter-track positions. Optimization of stitching gain results in greater accuracy of the PES reporting system which translates to improved track follow and seek performance.

The stitching gain is calibrated for each head at various tracks on the disk during a manufacturing process where a test computer is used to measure the P-PES and Q-PES at the quarter-track positions and then iteratively adjusts the PES gain to minimize the difference between the average P-PES and average Q-PES at those quarter-track positions. The resulting values of stitching gain, each associated with a corresponding head and track, are stored in memory in the disk drive and recalled during operation of the disk drive. However, for very high track densities, the asymmetry of the heads in the tracks and nonlinearities in the PES recording system can negatively influence the traditional averaging method, and result in less than optimal values of stitching gain. What is needed is a method that improves the robustness of the stitching gain calibration process.

SUMMARY OF THE INVENTION

The invention is a disk drive manufacturing method for calibrating the stitching gain of a position error signal (PES) by sampling the servo information while the head is maintained at the quarter-track positions and then calculating the kurtosis of the distribution of the PES values calculated from the samples. The kurtosis is a measure of the deviation of the distribution of PES values from a normal or Gaussian distribution.

In one embodiment the PES gain is adjusted based on the kurtosis, the servo information is again sampled, and the PES values again calculated using the adjusted PES gain. The process is repeated until the kurtosis is close to zero, indicating that the distribution of PES values is close to Gaussian, and the most recent value of adjusted gain is selected as the stitching gain value. In another embodiment a set of gain values are used, the servo information is sampled and the PES values calculated using each gain value in the set, and the kurtosis calculated for each PES distribution, resulting in a set of kurtosis values corresponding to the set of gain values. The gain value corresponding to the minimum absolute value of kurtosis is then selected as the stitching gain value.

If in either of the above embodiments of the method, the kurtosis does not decrease below a predetermined value, this indicates that an acceptable stitching gain can not be achieved for the head being tested, and the head is failed.

The stitching gain calibration is performed for all heads and for a series of tracks for each head. The resulting values of stitching gain, each associated with a head and track, are stored in the disk drive memory and recalled during operation of the disk drive.

For a fuller understanding of the nature and advantages of the present invention, reference should be made to the following detailed description taken together with the accompanying figures.

DESCRIPTION OF THE INVENTION

Prior Art

Figure 1:
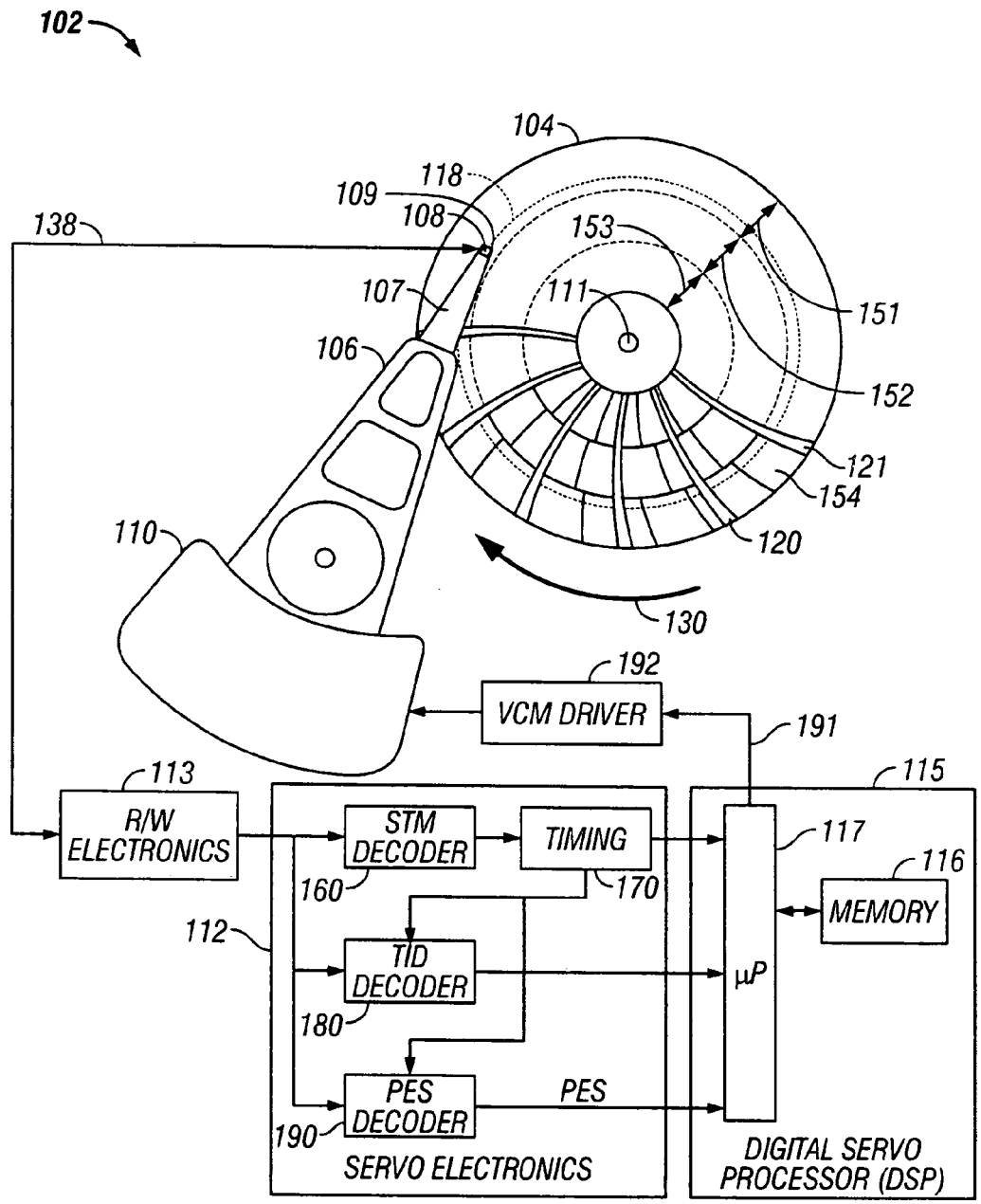
FIG. 1 is a block diagram of a prior art disk drive of the type usable with the present invention.

FIG. 1 is a block diagram of a conventional disk drive that uses sector servo and zone-bit recording (ZBR). The disk drive, designated generally as 102, includes data recording disk 104, a voice coil motor (VCM) 110 primary actuator, an actuator arm 106, a suspension 107, a head carrier or air-bearing slider 108, a data recording transducer 109 (also called a head, recording head or read/write head), read/write electronics 113, servo electronics 112, and digital servo processor (DSP) 115.

The recording head 109 may be an inductive read/write head or a combination of an inductive write head with a magnetoresistive read head and is located on the trailing end of slider 108. Slider 108 is supported on the actuator arm 106 by a suspension 107 that enables the slider to "pitch" and "roll" on an air-bearing generated by the rotating disk 104. Typically, there are multiple disks stacked on a hub that is rotated by a disk motor, with a separate slider and recording head associated with each surface of each disk.

Data recording disk 104 has a center of rotation 111 and is rotated in direction 130. Disk 104 is divided for head positioning purposes into a set of radially-spaced concentric tracks, one of which is shown as track 118. The disk drive in FIG. 1 is illustrated as a zone-bit-recording (ZBR) disk drive because the tracks are grouped radially into a number of zones, three of which are shown as zones 151, 152 and 153. Each track includes a plurality of circumferentially or angularly-spaced servo sectors that contain head positioning information for maintaining the heads on track and moving them between tracks. The servo sectors in each track are aligned circumferentially with the servo sectors in the other tracks so that they extend across the tracks in a generally radial direction, as represented by radially-directed servo sections 120. Each track has a reference index 121 indicating the start of track. Within each zone, the tracks are also circumferentially divided into a number of data sectors 154 where user data is stored. The set of tracks which are at the same radius on all disk data surfaces is referred to as a "cylinder".

Figure 2:
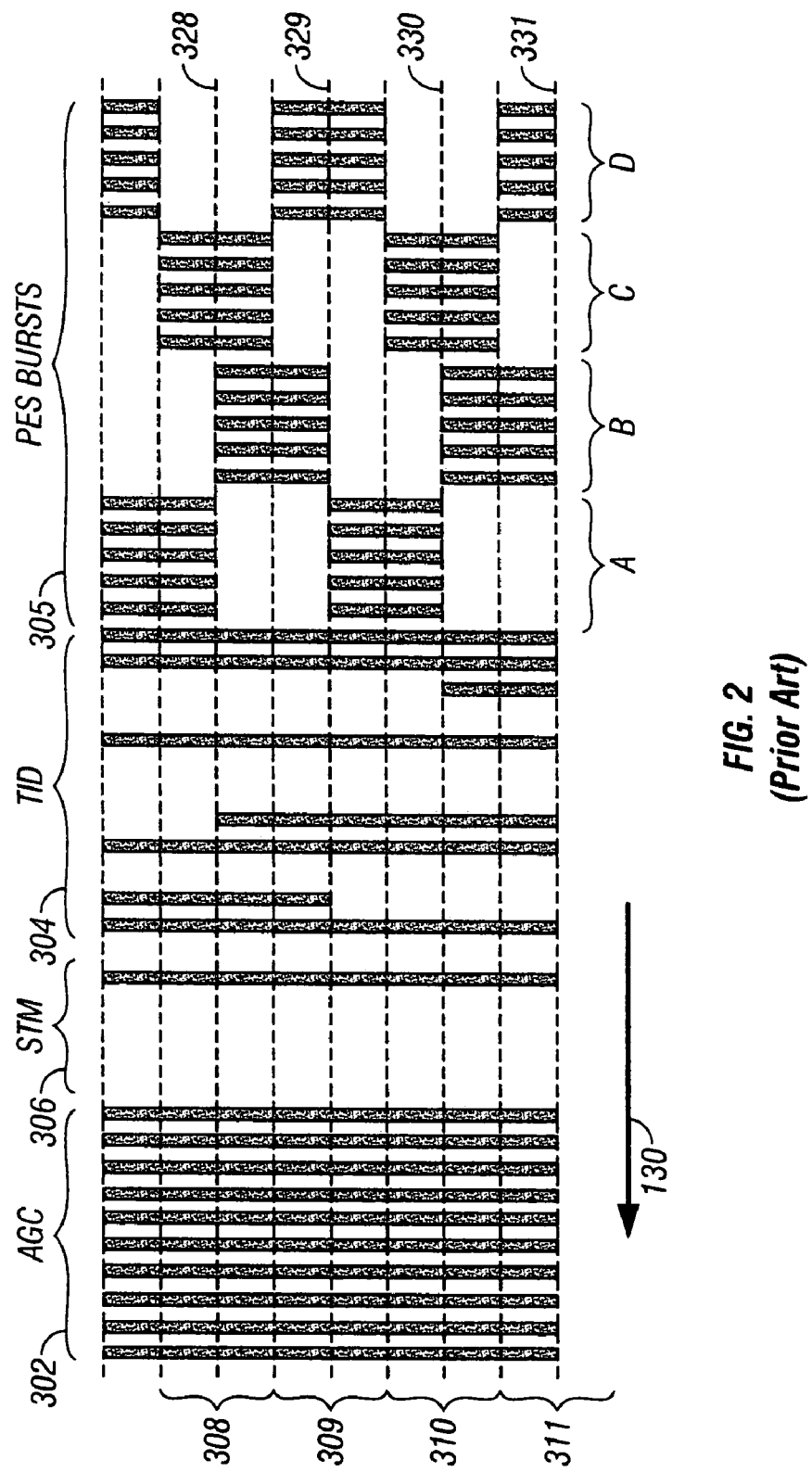
FIG. 2 is a view of a prior art servo pattern in the servo sectors of four adjacent tracks and shows a quad-burst position error signal (PES) pattern.

FIG. 2 is a schematic of a conventional servo pattern of the type commonly used in sector servo systems and shows a greatly simplified pattern for clarity with several tracks in one of the servo sections 120 (full tracks 308, 309, 310 and half-track 311, each having a respective track centerline 328, 329, 330 and 331). The servo pattern moves relative to head 109 in the direction shown by arrow 130. The two possible magnetic states of the medium are indicated as black and white regions. The servo pattern is comprised of four distinct fields: automatic gain control (AGC) field 302, servo-timing-mark (STM) field 306, track ID (TID) field 304 and position-error-signal (PES) field 305.

The AGC field 302 is a regular series of transitions and is nominally the same at all radial positions. The AGC field 302 allows the DSP 115 to calibrate timing and gain parameters for later fields.

The servo timing mark (STM) field 306 serves as a timing reference for reading the subsequent servo information in track identification (TID) field 304 and position error signal (PES) field 305. The STM is also referred to as a servo address mark or servo start mark.

The TID field 304 contains the track number, usually Gray-coded and written as the presence or absence of recorded dibits. The TID field 304 determines the integer part of the radial position of head 109.

The position error signal (PES) field 305 contains PES bursts A–D that form the well-known quad-burst or quadrature pattern and are used to determine the fractional part of the radial position of the head. Each PES burst comprises a series of regularly spaced magnetic transitions.

The servo information in the servo pattern of FIG. 2 is read by the read/write electronics 113 (FIG. 1), and signals are input to the servo electronics 112. The servo electronics 112 provides digital signals to DSP 115. The DSP 115 provides a control signal 191 to VCM driver 192 that controls current to the VCM 110 to position the head 109. Within the servo electronics 112, the STM decoder 160 receives a clocked data stream from the read/write electronics 113. Once an STM has been detected, an STM found signal is generated. The STM found signal is used to adjust timing circuit 170, which controls the operating sequence for the remainder of the servo sector. After detection of an STM, the track identification (TID) decoder 180 receives timing information from timing circuit 170, reads the clocked data stream, which is typically Gray-code encoded, and then passes the decoded TID information to DSP 115. Subsequently, the PES decoder 190 (also called the servo demodulator) captures the position information from the PES field 305 and passes a position error signal (PES) to DSP 115. The DSP 115 includes a microprocessor 117 that uses the PES as input to a control algorithm to generate the control signal 191 to VCM driver 192, and associated memory 116. A set of parameters based on the static and dynamic characteristics of the VCM 110 is stored in memory 116 and is used in the control algorithm.

The PES field 305 contains bursts that are arranged radially such that a burst of transitions are one track wide and two tracks apart, from centerline to centerline. The A and B bursts are the main bursts because when the head is at the track centers the read-back signal amplitudes from A and B are equal. When the head is at the half-track positions the amplitudes from C and D are equal. The PES bursts are radially offset from their neighbors such that when the head is centered over an even-numbered track (e.g., track 310 with centerline 330) the read-back signal from bursts A and B are equal. As the head moves off-track in a direction toward track 309, for example, the read-back signal from burst A increases and the read-back signal from burst B decreases until, with the head half-way between track centerlines 330 and 329 the read-back signals from bursts C and D are equal, the read-back signal from burst A is maximized and the read-back signal from burst B is minimized. As the head continues to move in the same direction the read-back signal from burst B increases and the read-back signal from burst A decreases until, with the head centered over the next track (with centerline 329) the read-back signal from burst C is minimized, the read-back signal from burst D is maximized and the read-back from signals from bursts A and B are again equal.

The servo decoder 190 derives two signals from PES field 305. The amplitudes for all four bursts are detected and the following two signals are derived:

$$P\text{-}PES = (G/N) * [Amp(A) - Amp(B)]$$

$$Q\text{-}PES = (G/N) * [Amp(C) - Amp(D)]$$

where G is the PES gain and N is the normalization constant. These two derived signals vary linearly within a track width. The signals are plotted as a function of cross-track position in FIG. 3. The signal P-PES, called the "normal" or "in-phase" PES, has zero magnitude at the center of each track and is used for a first region of the track width, i.e., between approximately $-\frac{1}{4}$ and $+\frac{1}{4}$ of the track positions. The signal Q-PES, called the "quadrature" PES, has zero magnitude at the mid-point or half-track positions between two tracks and is used for a second region of the track width, i.e., between approximately $+\frac{1}{4}$ and $+\frac{3}{4}$ of the track positions (and between approximately $-\frac{3}{4}$ and $-\frac{1}{4}$ of the track positions).

Figure 3:
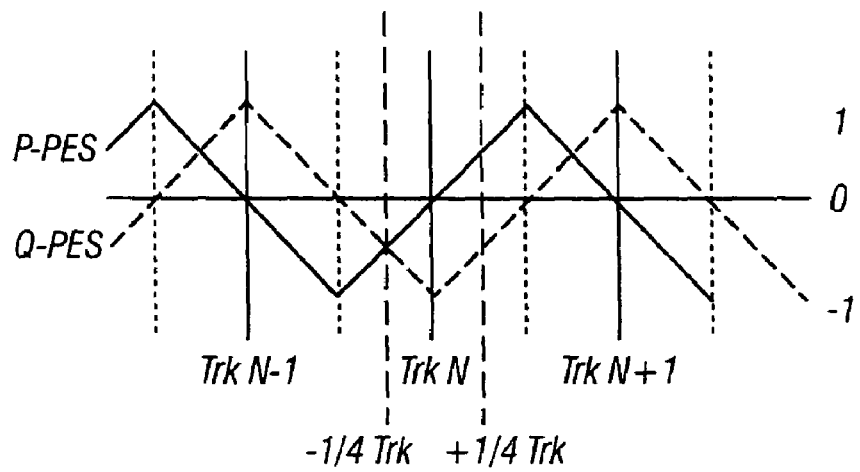
FIG. 3 is a graph of the P-PES and Q-PES signals as a function of track position.

FIG. 3 is an idealized schematic of the P-PES and Q-PES amplitudes as a function of off-track position. At the quarter-track positions, the absolute values of the P-PES and Q-PES signals are theoretically equal and one of the two signals must be selected as the PES to be used by the DSP 115 to generate the control signal 191. In practice, a gain must be adjusted to ensure a continuous transition from P-PES to Q-PES. The process is referred to as "stitching" the PES and, consequently, the quarter-track positions are referred to as "stitching" points while the gain is referred to as the "stitching" gain.

Figure 4:
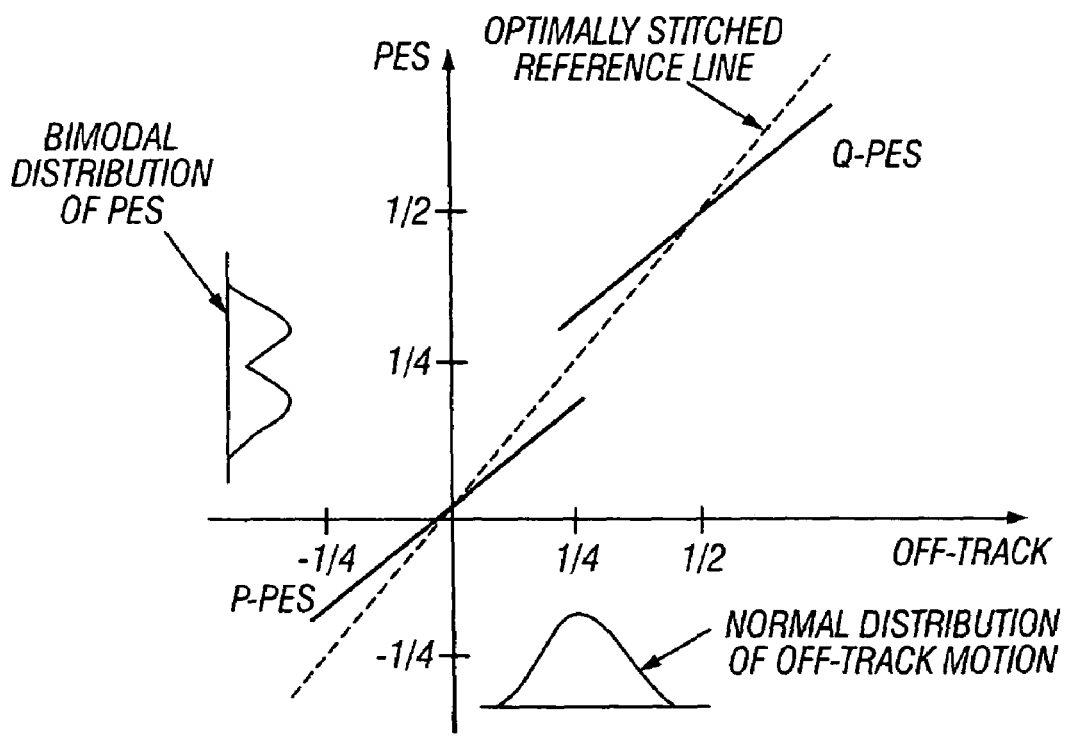
FIG. 4 is a graph of P-PES and Q-PES showing the discontinuities at the quarter-track positions.

FIG. 4 shows an example where the P-PES and Q-PES are discontinuous at the quarter-track positions. The example of FIG. 4 is for an "under-stitched" case, meaning that the PES gain is too low, as shown by the slope of the P-PES and Q-PES lines being lower than the slope of the dotted line representing the optimally-stitched case. For an "over-stitched" case, the PES gain is too high and the slope of the P-PES and Q-PES lines will be greater than the slope of the dotted line representing the optimally stitched case.

To calibrate the stitching gain at these quarter-track positions, a gain modification factor $\delta(i,j)$ is calculated for each head (i) and set (j) of tracks or cylinders at the time of manufacturing. The set of stitching gains $G(i,j)$ calculated from $\delta(i,j)$ are stored in the disk drive, e.g., in memory 116 (FIG. 1). The appropriate stitching gain $G(i,j)$ is then recalled from memory whenever the disk drive executes an operation on head (i).

In the prior art approach to calibrating the stitching gain during manufacturing, the head is moved to near the positive and negative quarter-track positions of a track near the middle of a zone and P-PES and Q-PES are measured at the positive and negative quarter-track positions for several disk rotations. The average P-PES is then compared to the average Q-PES and the gain is iteratively adjusted until there is minimal difference between the average P-PES and average Q-PES. The gain modification factor $\delta$ needed to make this gain adjustment is then used to modify the gain and the modified gain is stored in memory and associated with that head and track. The process is then repeated for all heads and zones. The result is that there is then a table of stitching gains $G(i,j)$, where (i,j) represent the head number and track or cylinder number, respectively. Then during operation of the disk drive the appropriate $G(i,j)$ is recalled and used to calculate the PES.

However, for high track densities (greater than ~80,000 tracks/inch), asymmetry of the head in the track and nonlinearity of the PES across the track have a significant effect on discontinuities at the quarter-track positions, so that the prior art averaging method results in less than optimal values of stitching gain.

The Invention

The inventive method measures the PES at both positive and negative quarter-track positions for each head at different tracks, and the gain is iteratively adjusted until the resulting distribution of PES samples approaches a Gaussian or normal distribution. The distribution of PES values measured at any track position during several disk rotations is a measure of the position error of the head with respect to the reference cylinder. While this position error, also referred to as off-track, has a Gaussian distribution due to the broadband nature of mechanical and electrical disturbances affecting the disk drive (as shown by the normal distribution curve on FIG. 4), discontinuities in the PES measurement system at the quarter-track positions can result in a non-Gaussian distribution in PES (as shown by the bi-modal distribution for the under-stitched case in FIG. 4).

In the inventive method, the kurtosis function is used as a metric to assess the extent the distribution of PES values measured at the quarter-track positions deviate from a Gaussian distribution. Here, kurtosis k is defined such that zero corresponds to a Gaussian distribution:

$$k = \frac{E(x-\mu)^4}{\sigma^4} - 3$$

where $\mu$ and $\sigma$ are the mean and standard deviation of x, and E is the expected value.

Figure 5A:
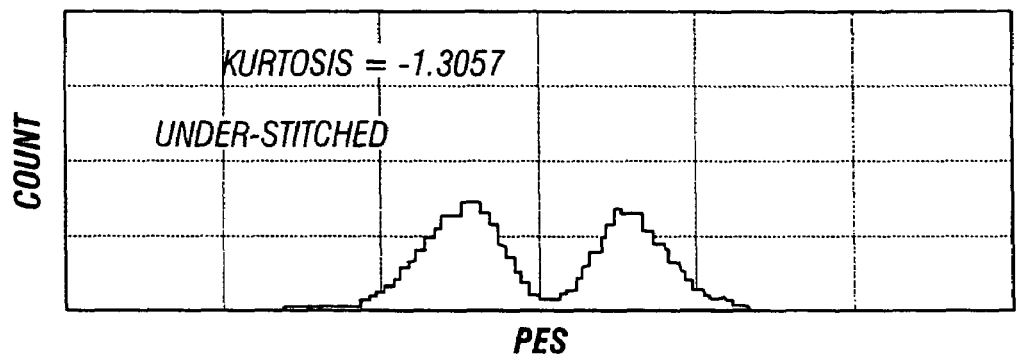
FIGS. 5A–5C illustrate three different distributions of PES samples and their corresponding kurtosis values, respectively.
Figure 5B:
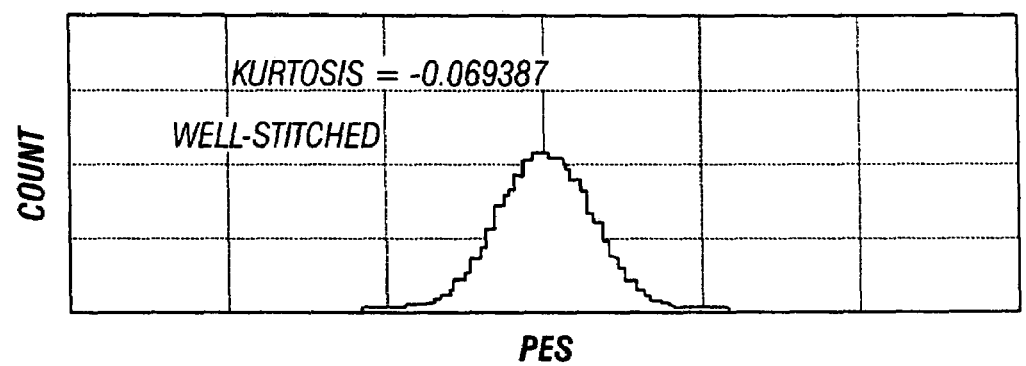
Figure 5C:
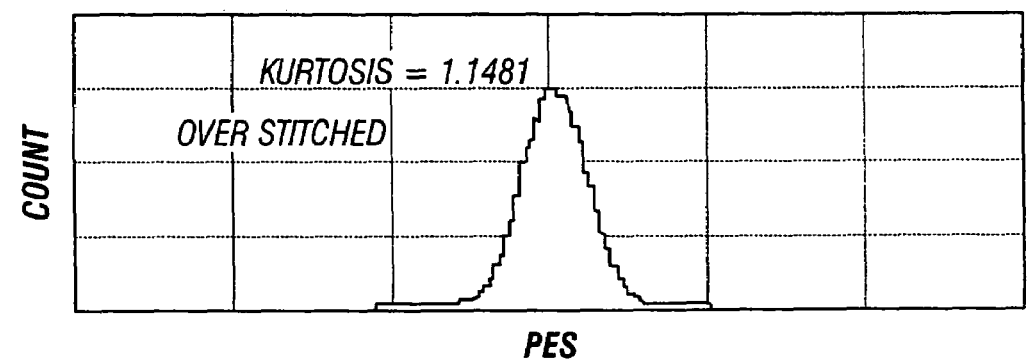

FIGS. 5A–5C illustrate how this definition of kurtosis changes as a function of the PES distribution. In these figures, the head is positioned at a quarter-track position and PES is collected over multiple disk rotations. FIG. 5A shows a distribution with a high negative kurtosis, indicating that the gain is too low or "under-stitched". FIG. 5B shows a near-Gaussian distribution with a near-zero kurtosis, indicating that the gain is near-optimal or "well-stitched". FIG. 5C shows a distribution with a high positive kurtosis, indicating that the gain is too high or "over-stitched".

Figure 6:
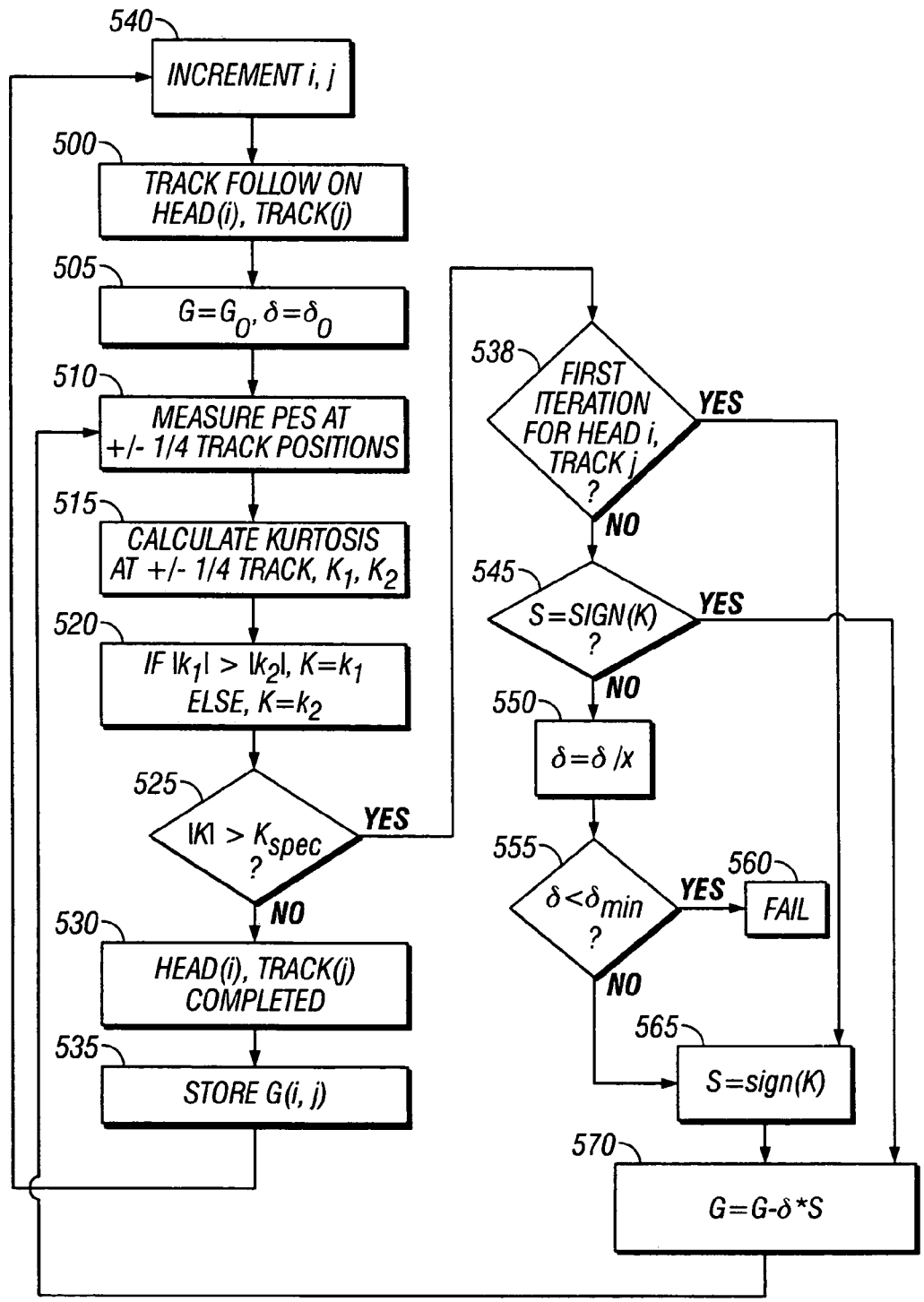
FIG. 6 is a flow chart illustrating a first embodiment of the inventive method.

FIG. 6 is a flow chart illustrating a first embodiment of the inventive method. The first head (i=0) to be calibrated is moved to the positive quarter-track position of the first track (j=0) to be calibrated. Both the gain and the gain modification factor are set to initial values, $G_0$ and $\delta_0$, respectively (block 505). The PES is then calculated for each servo sector for multiple revolutions of the disk, e.g., 30, after which the head is moved to the negative quarter-track position and the PES measurement repeated (block 510). The kurtosis value $k_1$ is then calculated for PES samples from the positive quarter-track position, and the kurtosis value $k_2$ is calculated for the PES samples from the negative quarter-track position (block 515). Next, in block 520, a kurtosis optimization metric, K, is defined in which the preferred definition is that K equals either $k_1$ or $k_2$, depending on which has the greater absolute value. An alternative definition is that K equals the average of $k_1$ and $k_2$. The absolute value of K is then compared to a specified maximum allowable value of kurtosis, $K_{spec}$ (block 525). $K_{spec}$ is selected to be close to zero, e.g. 0.3, but is large enough to still allow convergence of the optimum stitching gain.

If K is less than $K_{spec}$ then the distribution of PES values is considered close enough to Gaussian (k=0) and the calibration of the stitching gain for the head and track being tested is completed (block 530). The gain value associated with the head and track being calibrated is stored in the disk drive memory as $G(i,j)$ (block 535) and the method returns to incrementing i and j (block 540) until each head has been calibrated on each of the desired tracks, typically one track from each zone.

If K is greater than $K_{spec}$ (block 525), then the distribution of PES values is considered too far from a Gaussian distribution and the stitching gain must be adjusted. Block 538 tests for the first iteration, in which case the tracking variable S is not defined. If this is the case, then S is set to be equal to the sign of K (block 565) and then the gain G is adjusted in block 570 such that if S is positive, then the PES is "over-stitched" and G is decreased by the gain modification factor $\delta$, whereas if S is negative the PES is "under-stitched" and G is increased by $\delta$.

For the case in block 538 where this is not the first iteration for head (i) and track (j), the tracking variable S is then compared to the sign of K (block 545). If they are the same, then the sign of K has not changed from the previous iteration and the gain is adjusted according to block 570. If S does not equal the sign of K in block 545, then the previous gain correction overshot the kurtosis specification and the gain modification factor, δ, must be reduced (block 550). Then, δ is compared to the predetermined minimum $\delta_{min}$ (block 555) and if the new gain modification factor δ is less than $\delta_{min}$ then the head being calibrated is considered as failed (block 560). The value of $\delta_{min}$ is selected based on prior empirical data that shows that additional adjustments in gain will not result in an acceptable value for a stitching gain for that head. If δ is not less than $\delta_{min}$, then the sign of K is stored in S (block 565) and the gain is adjusted according to block 570. The method is then iteratively repeated and the PES is again calculated with the adjusted gain value (block 510) until K is less than $K_{spec}$.

Figure 7:
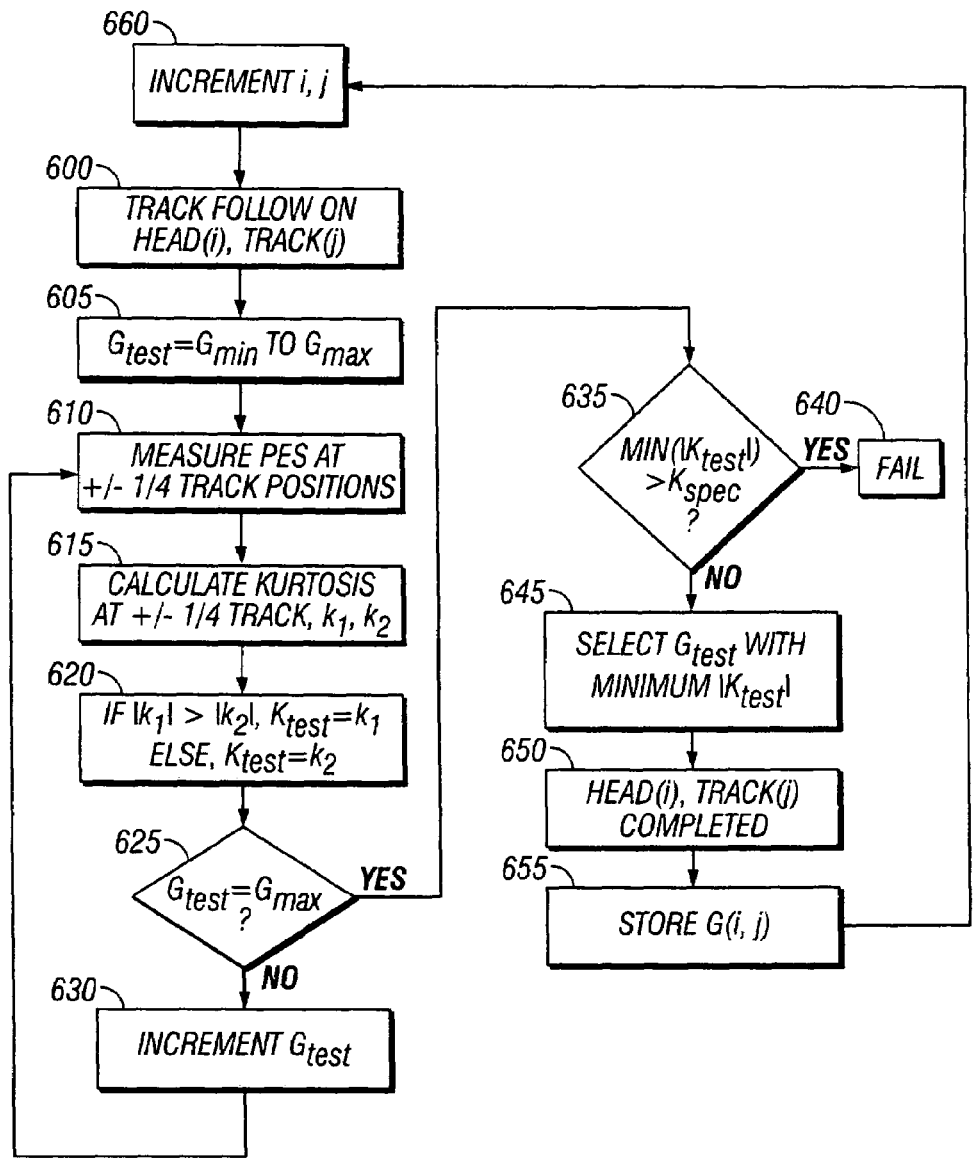
FIG. 7 is a flow chart illustrating a second embodiment of the inventive method

FIG. 7 is a flow chart illustrating a second embodiment of the inventive method. The first head (i=0) to be calibrated is moved to the positive quarter-track position of the first track (j=0) to be calibrated and the disk is rotated a number of times, e.g., 30 (block 600). This method calculates a kurtosis optimization metric, K, for each gain in a set of gain values from $G_{min}$ to $G_{max}$ (block 605). Using the first gain value $G_{min}$ in the set, the PES is calculated for each PES sample, after which the first head is moved to the negative quarter-track position for the first track, and the PES again calculated using the same gain value (block 610). The kurtosis value $k_1$ is then calculated for the PES samples from the positive quarter-track position, and the kurtosis value $k_2$ is then calculated for the PES samples from the negative quarter-track position (block 615). Next, in block 620, an optimization metric, K, is calculated for that particular gain value and, as for the method in FIG. 6, the preferred definition is that K equals either $k_1$ or $k_2$, depending on which has the greater absolute value. If not all gain values in the set have been tested (block 625) the next gain value in the set is selected (block 630) and the process repeats (block 610) until all gain values have been tested for that head and track.

After all gain values from $G_{min}$ to $G_{max}$ have been tested the result is a set of kurtosis values matched to a like set of gain values. Then, at block 635, if the kurtosis value with the smallest absolute value in the set is greater than $K_{spec}$ then the head being calibrated is considered as failed (block 640). Otherwise the gain value associated with the kurtosis value with the smallest absolute value is selected as the stitching gain value (block 645) and the calibration of the stitching gain for the head and track being tested is completed (block 650). This gain value is stored in the disk drive memory as G(i,j) associated with the head (i) and track (j) (block 655). The method then returns to incrementing either i or j, as appropriate (block 660), until each head has been calibrated on each of the desired tracks.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A method for calibrating the gain of a position error signal (PES) calculated from head-positioning servo information read by a disk drive read head in the tracks of the disk, the method comprising:

(a) positioning the head to a track on the disk;

(b) sampling the servo positioning information from the rotating disk;

(c) calculating a PES value for each sample using a gain value;

(d) calculating the kurtosis for the calculated PES values; and (e) adjusting the gain value in response to the calculated kurtosis.

2. The method of claim 1 wherein adjusting the gain value comprises associating the adjusted gain value with the track on which the head was positioned, and further comprising positioning the head to additional tracks and repeating steps (b) through (e) for each said additional track.

3. The method of claim 2 wherein the tracks on the disk are grouped into radially-spaced zones and wherein positioning the head to additional tracks comprises positioning the head to at least one track in each zone.

4. The method of claim 1 wherein steps (a) through (d) are performed with the head positioned at the positive one-quarter-track position and again with the head positioned at the negative one-quarter-track position.

5. The method of claim 4 wherein step (e) comprises adjusting the gain value in response to the calculated kurtosis having the greater absolute value.

6. The method of claim 4 wherein step (e) comprises adjusting the gain value in response to the absolute value of the average of the two calculated kurtosis values.

7. The method of claim 1 wherein the disk drive contains multiple heads and disks with each head being associated with a respective disk surface, and wherein adjusting the gain value comprises associating the adjusted gain value with the head that read the servo positioning information during the sampling, and further comprising repeating steps (a) through (e) for each head.

8. The method of claim 1 wherein the servo positioning information is located in angularly-spaced servo sectors in the tracks and wherein calculating a PES value for each sample comprises calculating a PES value for each servo sector.

9. The method of claim 1 wherein adjusting the gain value in response to the calculated kurtosis comprises:

repeating steps (b) through (d) using different gain values;

selecting the gain value resulting in the calculated kurtosis having the lowest absolute value; and storing the selected gain value in the disk drive.

10. A method for calibrating the stitching gain of a position error signal (PES) calculated in a disk drive from servo positioning information read by a disk drive read head, the disk drive having a plurality of read heads and a plurality of associated disk surfaces with generally concentric tracks having angularly-spaced servo sectors containing bursts of head-positioning servo information in a quadrature servo pattern, the calculated PES being a P-PES for a first region of the track width and a Q-PES for a second region of the track width and wherein a stitching gain is required to compensate for discontinuities between the P-PES and Q-PES near the positive one-quarter-track and negative one-quarter-track positions, the method comprising:

(a) positioning a head to near a positive one-quarter-track position in a track on the disk;

(b) sampling the servo sectors as the disk rotates;

(c) calculating a P-PES value and a Q-PES value for each sample using a gain value selected from a set of gain values;
(d) selecting either the calculated P-PES value or the calculated Q-PES value for each sample as the PES value for each sample;
(e) calculating the kurtosis for the selected PES values;
(f) repeating steps (b) through (e) with the head positioned near a negative one-quarter-track position in the track;
(g) associating the selected gain value with the kurtosis having the greater absolute value;
(h) repeating steps (a) through (g) for each gain value in the set, whereby each gain value in the set is associated with a kurtosis value in a set of kurtosis values; and
(i) storing in the disk drive, for the head and track, the gain value associated with the kurtosis having the lowest absolute value in the set of kurtosis values; and
(j) repeating steps (a) through (i) for a different track.

11. The method of claim 10 further comprising repeating steps (a) through (j) for each head.

12. The method of claim 10 wherein the tracks on each disk surface are grouped into radially-spaced zones and wherein positioning the head in a track comprises positioning the head in at least one track in each zone.

13. The method of claim 12 further comprising repeating steps (a) through (j) for each head.

* * * * *